United States Patent
Han et al.

(10) Patent No.: US 10,965,404 B2
(45) Date of Patent: Mar. 30, 2021

(54) METHOD FOR TRANSMISSION DURATION PATTERN

(71) Applicant: ZTE CORPORATION, Guangdong (CN)

(72) Inventors: Xianghui Han, Shenzhen (CN); Shuqiang Xia, Shenzhen (CN); Bo Dai, Shenzhen (CN); Qian Dai, Shenzhen (CN); Wen Zhang, Shenzhen (CN); Jing Shi, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 82 days.

(21) Appl. No.: 15/952,490

(22) Filed: Apr. 13, 2018

(65) Prior Publication Data
US 2018/0234213 A1 Aug. 16, 2018

Related U.S. Application Data

(63) Continuation of application No. PCT/CN2016/102012, filed on Oct. 13, 2016.

(30) Foreign Application Priority Data

Oct. 13, 2015 (CN) .......................... 201510659393.1

(51) Int. Cl.
| | |
|---|---|
| H04L 1/18 | (2006.01) |
| H04L 1/16 | (2006.01) |
| H04W 72/04 | (2009.01) |

(52) U.S. Cl.
CPC .......... *H04L 1/1812* (2013.01); *H04L 1/1607* (2013.01); *H04L 1/18* (2013.01);
(Continued)

(58) Field of Classification Search
None
See application file for complete search history.

(56) References Cited

U.S. PATENT DOCUMENTS

| | | |
|---|---|---|
| 2005/0249120 A1 | 11/2005 | Heo |
| 2010/0192035 A1 | 7/2010 | Sagfors |
(Continued)

FOREIGN PATENT DOCUMENTS

| | | |
|---|---|---|
| CN | 1722652 A | 1/2006 |
| CN | 102342061 A | 2/2012 |
(Continued)

OTHER PUBLICATIONS

International Search Report in international application No. PCT/CN2016/102012, dated Jan. 18, 2017, 2 pgs.
(Continued)

*Primary Examiner* — Andre Tacdiran
(74) *Attorney, Agent, or Firm* — Li & Cai Intellectual Property (USA) Office

(57) ABSTRACT

Provided are a hybrid automatic repeat request timing method and apparatus. The method comprises: in the case where a device detects physical shared channel transmission within a first target transmission time interval (TTI), the device transmitting an acknowledgement instruction (ACK) response or a negative acknowledgement instruction (NACK) response of a hybrid automatic repeat request (HARQ) of a corresponding physical shared channel within the (pre-set number)th TTI after a second target TTI, wherein the number of symbols L1 contained in a TTI for downlink data transmission and the number of symbols L2 contained in a TTI for uplink data transmission satisfy the following condition: $LI \in \{1, 2, 3, 4, 5, 6, 7\}$, $I=1$ or $2$. According to the embodiments of the present invention, the problem in the relevant art that an HARQ timing relation-
(Continued)

ship cannot satisfy the further shortening of a TTI length is solved.

14 Claims, 11 Drawing Sheets

(52) U.S. Cl.
CPC .......... *H04L 1/1854* (2013.01); *H04L 1/1887* (2013.01); *H04W 72/0446* (2013.01)

(56) References Cited

U.S. PATENT DOCUMENTS

| | | | |
|---|---|---|---|
| 2011/0029833 A1 | 2/2011 | Zhang | |
| 2011/0138244 A1 | 6/2011 | Zhu | |
| 2013/0111288 A1 | 5/2013 | Sagfors | |
| 2014/0269454 A1* | 9/2014 | Papasakellariou | H04W 52/34 370/280 |
| 2014/0286255 A1* | 9/2014 | Nam | H04L 1/1861 370/329 |
| 2015/0092631 A1 | 4/2015 | Meng et al. | |
| 2015/0163020 A1 | 6/2015 | Sagfors et al. | |
| 2016/0043848 A1* | 2/2016 | Kim | H04L 5/0051 370/280 |
| 2016/0112171 A1* | 4/2016 | Sorrentino | H04L 5/0037 370/329 |
| 2016/0143030 A1* | 5/2016 | Lee | H04L 1/1812 370/329 |
| 2016/0205631 A1* | 7/2016 | Chen | H04W 52/04 455/522 |
| 2016/0352551 A1* | 12/2016 | Zhang | H04L 5/0007 |
| 2018/0042013 A1* | 2/2018 | Byun | H04L 27/2602 |
| 2018/0098337 A1* | 4/2018 | Lee | H04W 72/042 |
| 2018/0220419 A1* | 8/2018 | Takeda | H04W 72/0446 |
| 2018/0255543 A1* | 9/2018 | Takeda | H04B 1/713 |
| 2018/0287743 A1* | 10/2018 | Byun | H04L 1/1819 |
| 2018/0294942 A1* | 10/2018 | Byun | H04L 5/1469 |

FOREIGN PATENT DOCUMENTS

| | | |
|---|---|---|
| CN | 102523083 A | 6/2012 |
| CN | 102687451 A | 9/2012 |
| CN | 104219018 A | 12/2014 |
| CN | 104254996 A | 12/2014 |
| CN | 104468030 A | 3/2015 |
| CN | 105933100 A | 9/2016 |
| KR | 20110103454 A | 9/2011 |
| TW | 201141123 A | 11/2011 |
| WO | 2010078583 A2 | 7/2010 |
| WO | 2011068589 A2 | 6/2011 |
| WO | 2015172363 A1 | 11/2015 |
| WO | WO 2016014642 A1 | 1/2016 |

OTHER PUBLICATIONS

English Translation of the Written Opinion of the International Search Authority in international application No. PCT/CN2016/102012, dated Jan. 18, 2017, 8 pgs.
Nokia Networks et al. "Considerations of FDD DL HARQ for Supporting Latency Reduction", Feb. 2016, R1-160798, 3GPP TSG-RAN WG1 Meeting #84, pp. 1-4.
European Patent Office, Patent search report dated Apr. 4, 2019.

* cited by examiner

When equipment detects physical shared channel transmission in a first target TTI, transmit, within a $k$th TTI after a second target TTI, by the equipment, an ACK response or NACK response corresponding to a HARQ of a physical shared channel, where $k$ is a preset number — S202

FIG. 2

Transmission module 20

FIG. 11

METHOD FOR TRANSMISSION DURATION PATTERN

CROSS-REFERENCE TO RELATED APPLICATIONS

This application is a continuation of and claims priority to PCT application PCT/CN2016/102012, filed on Oct. 13, 2016, which claims priority to Chinese application 201510659393.1, filed on Oct. 13, 2015. PCT application PCT/CN2016/102012 and Chinese application 201510659393.1 are incorporated herein by reference.

TECHNICAL FIELD

Embodiments of the present disclosure relate to the field of communications, and more particularly to a Hybrid Automatic Repeat Request (HARQ) timing method and device.

BACKGROUND

In 3rd Generation Partnership Project (3GPP) Long Term Evolution (LTE) and LTE-Advanced (LTE-A) systems, a Transmission Time Interval (TTI) is a basic unit for downlink and uplink transmission scheduling on a time domain. In an LTE/LTE-A Frequency Division Duplex (FDD) system, radio frames with lengths of 10 ms are divided in a time dimension, where each radio frame includes 10 subframes, and a length of a TTI is equal to a length 1 ms of a subframe. Each subframe includes two slots, and a length of each slot is 0.5 ms. Each downlink slot includes 7 Orthogonal Frequency Division Multiplexing (OFDM) symbols (6 OFDM symbols under an extended cyclic prefix). Each uplink slot includes 7 Single Carrier-Frequency Division Multiplexing Access (SC-FDMA) symbols (6 SC-FDMA symbols under an extended cyclic prefix).

In LTE/LTE-A, a HARQ mechanism is adopted to rapidly correct a transmission error caused by channel fluctuation. A receiver judges correctness of a received data packet by Cyclic Redundancy Check (CRC), and if data is correctly received, an Acknowledged (ACK) is fed back to a sender; and if the data is incorrectly received, a Non-Acknowledged (NACK) is fed back to the sender, and the sender retransmits the corresponding data packet.

In an LTE/LTE-A FDD system, HARQ timing of a Physical Downlink Share Channel (PDSCH), i.e., a downlink HARQ timing relationship, is specified as follows. User Equipment (UE) detects PDSCH transmission or a Physical Downlink Control Channel (PDCCH) indicating downlink Semi-Persistent Scheduling (SPS) release on a subframe n and transmits a corresponding HARQ-ACK response on a subframe n+4.

In the LTE/LTE-A FDD system, HARQ timing of a Physical Uplink Share Channel (PUSCH), i.e., an uplink HARQ timing relationship, is specified as follows: if the UE detects HARQ information on a downlink subframe n, the information corresponds to the PUSCH sent on an uplink subframe n−4 by the UE.

A downlink HARQ ACK timing relationship in LTE/LTE-A is considered. FIG. 1 is a schematic diagram of an existing timing relationship of downlink data transmission and uplink HARQ ACK corresponding to TTI=1 ms. As shown in FIG. 1, in an FDD mode, downlink data of a PDSCH is sent to UE on a subframe n, and the UE receives it after a certain propagation delay (represented by $T_P$ in the figure), and sends an ACK/NACK message in an uplink subframe n+4 after decoding a received signal or performing soft combining with data received before for decoding. A network determines to retransmit corresponding data or send new data in a subframe (n+8) on the basis of reception of feedback information, where the timing relationship is related to a transmission time, the propagation delay, a receiving time and a processing time.

In a subsequent 3GPP evolved system, for example, a 5th-Generation (5G) mobile communication system, an ultralow-delay service (a delay is reduced to be about 1 ms) may be supported, and an existing TTI with a length of 1 ms may not meet a requirement anymore. A smaller TTI length is favorable for exponentially reducing a delay of a unidirectional link. For example, the TTI is shortened to a length of 1~7 OFDM symbols or SC-FDMA symbols.

However, further reduction in a TTI length may change a transmission time, a receiving time and a processing time to make an existing timing relationship inapplicable. In addition, for supporting a low-delay service more flexibly, there may be TTIs with different lengths in uplink transmission or downlink transmission and different TTIs may be adopted for downlink and uplink data transmission. However, there is no corresponding TTI design solution and corresponding HARQ ACK timing solution at present.

For the problem in a related technology that a HARQ timing relationship may not meet further reduction of a TTI length, there is yet no effective solution at present.

SUMMARY

The embodiments of the disclosure provide a HARQ timing method and device, so as to at least solve the problem in the related technology that a HARQ timing relationship may not meet further reduction of a TTI length.

According to one aspect of the embodiments of the disclosure, a HARQ timing method is provided, which may include the following actions. Upon detection of physical shared channel transmission in a first target TTI, the equipment transmits, within a kth TTI after a second target TTI, an ACK response or NACK response corresponding to a HARQ of a physical shared channel in a TTI, where k is a preset number and where at least one of a number $L_1$ of symbols included in TTIs configured for downlink data transmission or a number $L_2$ of symbols included in TTIs configured for uplink data transmission may meet the following conditions: $L_1 \in \{1, 2, 3, 4, 5, 6, 7\}$ and I=1 or 2.

According to an embodiment, when the equipment is a radio base station, the physical shared channel may be a PUSCH, and each of the first target TTI, the second target TTI and the kth TTI after the second target TTI is an TTI configured for downlink data transmission; and when the equipment is UE, the physical shared channel may be a PDSCH, and each of the first target TTI, the second target TTI and the kth TTI after the second target TTI may be TTI configured for uplink data transmission.

According to an embodiment, the TTIs configured for downlink data transmission may meet the following conditions: there are X TTIs configured for downlink data transmission in 1 ms, where $2 \leq X \leq N_{syb1}$, $N_{syb1}$ may be a number of OFDM symbols included in a 1 ms subframe and X may be an integer; and a number of OFDM symbols included in each TTI configured for downlink data transmission is $X_i$, $X_i \in \{1, 2, 3, 4, 5, 6, 7\}$, where i may be an index of the TTI configured for downlink data transmission in 1 ms, $0 \leq i \leq X-1$ and i may be an integer.

According to an embodiment, the TTIs configured for uplink data transmission may meet the following conditions:

there are Y TTIs configured for uplink data transmission in 1 ms, where $2 \leq Y \leq N_{syb2}$, $N_{syb2}$ may be a number of SC-FDMA symbols included in a 1 ms subframe and Y may be an integer; and a number of the SC-FDMA symbols included in each TTI configured for uplink data transmission is $Y_j$, $Y_j \in \{1, 2, 3, 4, 5, 6, 7\}$, where j may be an index of the TTI configured for uplink data transmission in 1 ms, $0 \leq j \leq Y-1$ and j may be an integer.

According to an embodiment, when X=Y and, for i=j, $X_i=Y_j$ and when the equipment is a radio base station, an index of the second target TTI may be the same as an index of the first target TTI corresponding to detection of the PUSCH and the preset number may be more than or equal to 4; and when X=Y and, for i=j, $X_i=Y_j$ and when the equipment is UE, the index of the second target TTI may be the same as the index of the first target TTI corresponding to detection of the PDSCH and the preset number may be more than or equal to 4.

According to an embodiment, when X≠Y, a length of each TTI configured for downlink data transmission is the same and a length of each TTI configured for uplink data transmission is the same and when the equipment is a radio base station, the preset number may meet the following condition:

$$k_{n,1} \geq \left\lceil \frac{M \cdot t_{BS\_de}}{N} + t_{BS\_code} \right\rceil + 1,$$

where $k_{n,1}$ may be the preset number, $\lceil \ \rceil$ may represent rounding up, $$\frac{1}{M}\text{ms}$$

may be the length of each TTI configured for downlink data transmission, $$\frac{1}{N}\text{ms}$$

may be the length of each TTI configured for uplink data transmission, $t_{BS\_de}$ may be a decoding time of the radio base station receiving a PUSCH in case of a 1 ms TTI length, and $t_{BS\_code}$ may be a coding time for data transmission of the radio base station in case of the 1 ms TTI length; and when X≠Y, the length of each TTI configured for downlink data transmission is the same and the length of each TTI configured for uplink data transmission is the same and when the equipment is UE, the preset number may meet the following condition:

$$k_{n,2} \geq \left\lceil \frac{N \cdot t_{UE\_de}}{M} + t_{UE\_code} + \frac{2N}{3Q} \right\rceil + 1,$$

where $k_{n,2}$ may be the preset number, Q=max{M, N}, $t_{UE\_code}$ may be a decoding time of the UE receiving a PDSCH in case of the 1 ms TTI length, and $t_{UE\_code}$ may be a coding time for data transmission of the UE in case of the 1 ms TTI length.

According to an embodiment, at least one of $t_{BS\_code}=t_{BS\_de}=1.5$; or $t_{UE\_code}=t_{UE\_de}=1.15$ is true.

According to an embodiment, when N=A·M and A is an integer more than or equal to 2 and when the equipment is a radio base station, the index of the second target TTI may be the same as the index of the first target TTI corresponding to detection of the PDSCH; and when N=A·M and A is an integer more than or equal to 2 and when the equipment is UE, the index of the second target TTI may meet the following condition:

$$n = A \cdot \left( \left\lfloor \frac{a}{A} \right\rfloor + 1 \right) - 1,$$

where n may be the index of the second target TTI, a may be the index of the first target TTI corresponding to detection of the PDSCH, and $\lfloor \ \rfloor$ may represent rounding down.

According to an embodiment, when M=B·N and B is an integer more than or equal to 2 and when the equipment is a radio base station, the index of the second target TTI may meet the following condition:

$$m = B \cdot \left( \left\lfloor \frac{b}{B} \right\rfloor + 1 \right) - 1,$$

where m may be the index of the second target TTI, and b may be the index of the first target TTI corresponding to detection of the PUSCH; and when M=B·N and B is an integer more than or equal to 2 and when the equipment is UE, the index of the second target TTI may be the same as the index of the first target TTI corresponding to detection of the PDSCH.

According to an embodiment, the equipment may include first equipment and second equipment, where the first equipment may be a radio base station and the second equipment may be UE, or the first equipment may be UE and the second equipment may be a radio base station; and when the first equipment corresponds to multiple sending TTIs of the second equipment in a time-domain range of the first target TTI, before the action of transmitting, by the first equipment, within the kth TTI after the second target TTI, the ACK response or NACK response corresponding to the HARQ of the physical shared channel, the method may further include the following actions. At least one binding window is set for the multiple sending TTIs of the second equipment in the first target TTI of the first equipment, where each binding window may include at least one of the sending TTIs of the second equipment.

According to an embodiment, each binding window may be configured for independent HARQ feedback.

According to an embodiment, when X=4, Y=14, $X_0=4$, $X_1=3$, $X_2=4$, $X_3=3$ and, for $0 \leq j \leq 13$, $Y_j=1$, the action that the equipment transmits, within the kth TTI after the second target TTI, the ACK response or NACK response corresponding to the HARQ of the physical shared channel may include the following actions. When PDSCH transmission is detected by UE in the first target TTIs, the ACK response or NACK response corresponding to the PDSCH is transmitted, within an eighth TTI or an TTI later than the eighth TTI after the second target TTI:the first target TTIs with indexes of 0 to 3 corresponding to the second target TTI with index of 3, and the first target TTIs with indexes of 7 to 10 corresponding to the second target TTI with index of 7. When PDSCH transmission is detected by the UE in the first target TTIs, the ACK response or NACK response corresponding to the PDSCH is transmitted, within a seventh TTI or an TTI later than the seventh TTI after the second target TTI; the first target TTIs with indexes of 4 to 6 corresponding to the second target TTI with index of 6, and the first target TTIs with indexes of 11 to 13 corresponding to the second target TTI with index of 13. When PUSCH transmission is detected by a radio base station in the first target TTI, the ACK response or NACK response corresponding to the PUSCH is transmitted, within a fourth TTI or an TTI later than the fourth TTI after the second target TTI; the first target TTI with index of 0 corresponding to the second target TTI with index of 0, and the first target TTI with index of 2 corresponding to the second target TTI with index of 2. When PUSCH transmission is detected by the radio base station in the first target TTI, the ACK response or NACK response corresponding to the PUSCH is transmitted, within a third TTI or an TTI later than the third TTI after the second target TTI; the first target TTI with index of 1 corresponding to the second target TTI with index of 1, and the first target TTI with index of 3 corresponding to the second target TTI with index of 3.

According to an embodiment, at least one of two adjacent TTIs configured for downlink data transmission may at least include one of Cell-specific Reference Signals (CRSs) or Demodulation Reference Signals (DMRSs).

According to an embodiment, before the action of transmitting, by the equipment, within the kth TTI after the second target TTI, the ACK response or NACK response corresponding to the HARQ of the physical shared channel, the method may further include the following actions. At least one of two adjacent TTIs configured for downlink data transmission is made to at least include one of CRSs or DMRSs by virtue of any one of the following actions: executing division on a 1 ms TTI according to locations of CRSs or DMRSs in a 1 ms subframe to make at least one of two adjacent TTIs configured for downlink data transmission at least include one of the CRSs or the DMRSs; increasing a number of the CRSs or DMRSs in the 1 ms subframe and executing division on the 1 ms TTI after the number of the CRSs or the DMRSs is increased to make the at least one of the two adjacent TTIs configured for downlink data transmission at least include one of the CRSs or DMRSs; and regulating the locations of the CRSs or DMRSs in the 1 ms subframe and executing division on the 1 ms TTI after the locations of the CRSs or the DMRSs are regulated to make the at least one of the two adjacent TTIs configured for downlink data transmission at least include one of the CRSs or the DMRSs.

According to an embodiment, at least one of two adjacent TTIs configured for uplink data transmission may include DMRSs.

According to an embodiment, before the action of transmitting, by the equipment, within the kth TTI after the second target TTI, the ACK response or NACK response corresponding to the HARQ of the physical shared channel, the method may further include the following actions. At least one of two adjacent TTIs configured for uplink data transmission is made to at least include DMRSs by virtue of any one of the following actions: at least one of two adjacent TTIs configured for uplink data transmission is made to at least include DMRSs by virtue of any one of the following actions: executing division on a 1 ms TTI according to locations of DMRSs in a 1 ms subframe to make at least one of two adjacent TTIs configured for uplink data transmission at least include the DMRSs; increasing a number of the DMRSs in the 1 ms subframe and executing division on the 1 ms TTI after the number of the DMRSs is increased to make the at least one of the two adjacent TTIs configured for uplink data transmission at least include the DMRSs; and regulating the locations of the DMRSs in the 1 ms subframe and executing division on the 1 ms TTI after the locations of the DMRSs are regulated to make the at least one of the two adjacent TTIs configured for downlink data transmission at least include the DMRSs.

According to the other aspect of the embodiments of the disclosure, a HARQ timing device is provided, which may include: a transmission module, configured to, when physical shared channel transmission is detected in a first target TTI, transmit, within a kth TTI after a second target TTI, an ACK response or NACK response corresponding to a HARQ of a physical shared channel, where k is a preset number, and where at least one of a number $L_1$ of symbols included in TTIs configured for downlink data transmission or a number $L_2$ of symbols included in TTIs configured for uplink data transmission may meet the following conditions: $L_I \in \{1, 2, 3, 4, 5, 6, 7\}$ and $I=1$ or $2$.

In the embodiments of the disclosure, a computer storage medium is further provided, which may store an executable instruction, the executable instruction being configured to execute the HARQ timing method in the abovementioned embodiments.

According to the disclosure, when the equipment detects physical shared channel transmission in the first target TTI, the equipment transmits, within the kth TTI after the second target TTI, the ACK response or NACK response corresponding to the HARQ of the physical shared channel, where at least one of the number $L_1$ of the symbols included in the TTIs configured for downlink data transmission or the number $L_2$ of the symbols included in the TTIs configured for uplink data transmission meets the following conditions: $L_I \in \{1, 2, 3, 4, 5, 6, 7\}$ and $I=1$ or $2$. Therefore, the problem in the related technology that a HARQ timing relationship may not meet further reduction of a TTI length is solved, and the effect that the HARQ timing relationship may flexibly support a low-delay service is further achieved.

BRIEF DESCRIPTION OF DRAWINGS

The drawings described here are adopted to provide a further understanding to the disclosure and form a part of the application. Schematic embodiments of the disclosure and descriptions thereof are adopted to explain the disclosure and not intended to form improper limits to the disclosure. In the drawings:

FIG. 2 is a flowchart of a HARQ timing method according to an embodiment of the disclosure.

FIG. 11 is a structure block diagram of a HARQ timing device according to an embodiment of the disclosure.

DETAILED DESCRIPTION

Figure 1:
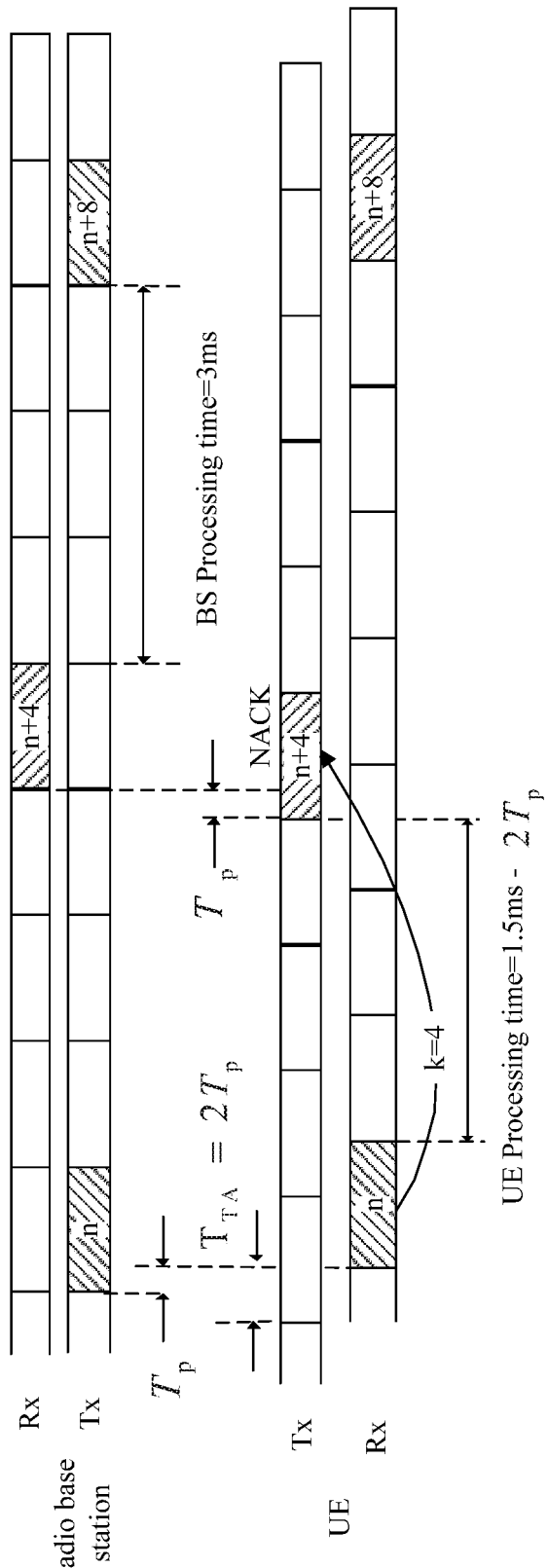
FIG. 1 is a schematic diagram of an existing timing relationship of downlink data transmission and uplink HARQ ACK corresponding to TTI=1 ms.

The disclosure will be described below with reference to the drawings and in combination with the embodiments in detail. It should be noted that the embodiments in the application and characteristics in the embodiments may be combined without conflicts.

It should be noted that terms "first", "second" and the like in the specification, claims and drawings of the disclosure are adopted not to describe a specific sequence or order but to distinguish similar objects.

An embodiment provides a HARQ timing method. FIG. 2 is a flowchart of a HARQ timing method according to an embodiment of the disclosure. As shown in FIG. 2, the flow includes the following steps.

In S202, upon detection of physical shared channel transmission in a first target TTI, the equipment transmits, within a kth TTI after a second target TTI, an ACK response or NACK response corresponding to a HARQ of a physical shared channel, wherein k is a preset number after a second target TTI and where at least one of a number $L_1$ of symbols included in TTIs configured for downlink data transmission or a number $L_2$ of symbols included in TTIs configured for uplink data transmission meets the following conditions: $L_1 \in \{1, 2, 3, 4, 5, 6, 7\}$ and I=1 or 2.

Specifically, the preset number in the embodiment is related to structural characteristics (including a number relationship between the TTIs configured for uplink data transmission and the TTIs configured for downlink data transmission, a length characteristic of at least one of each TTI configured for uplink data transmission or each TTI configured for downlink data transmission and the like) of the TTIs configured for uplink data transmission and the TTIs configured for downlink data transmission. In the embodiment, the preset number will not be specifically limited. For different designs of the TTIs configured for uplink data transmission (the TTIs configured for downlink data transmission), a specific numerical value of the preset number may be adaptively set. For example, when the TTIs configured for downlink data transmission in 1 ms and the TTIs configured for uplink data transmission in 1 ms are completely the same, the preset number may be set to be more than or equal to 4.

It should be noted that, in the embodiment, when the equipment receives PUSCH transmission, the equipment may transmit the ACK response or NACK response corresponding to PUSCH transmission in a downlink TTI, that is, the first target TTI, the second target TTI and the TTI with the preset number thereafter are all downlink TTIs at this moment; and when the equipment receives PDSCH transmission, the equipment may transmit the ACK response or NACK response corresponding to PDSCH transmission in an uplink TTI, that is, the first target TTI, the second target TTI and the TTI with the preset number thereafter are all uplink TTIs at this moment. For example, equipment receiving PUSCH transmission is a radio base station and equipment receiving PDSCH transmission is UE.

It should be noted that the first target TTI, second target TTI and preset number when the equipment is a radio base station may be the same as or different from (or partially the same as and partially different from) the first target TTI, second target TTI and preset number when the equipment is UE.

According to the embodiment, when lengths of the TTIs configured for downlink data transmission or the TTIs configured for uplink data transmission are further reduced and when the equipment detects physical shared channel transmission in the first target TTI, the equipment transmits, within the kth TTI after the second target TTI, the ACK response or NACK response corresponding to the HARQ of the physical shared channel, so that the problem in the related technology that a HARQ timing relationship may not meet further reduction of a TTI length is solved, and the effect that the HARQ timing relationship may flexibly support a low-delay service is further achieved.

Optionally, when the equipment is a radio base station, the physical shared channel is a PUSCH, and each of the first target TTI, the second target TTI or the kth TTI after the second target TTI is an TTI configured for downlink data transmission; and when the equipment is UE, the physical shared channel is a PDSCH, and each of the first target TTI, the second target TTI and the kth TTI after the second target TTI is an TTI configured for uplink data transmission.

Optionally, the TTIs configured for downlink data transmission meet the following conditions: there are X TTIs configured for downlink data transmission in 1 ms, where $2 \leq X \leq N_{syb1}$, $N_{syb1}$ is a number of OFDM symbols included in a 1 ms subframe and X is an integer; and a number of OFDM symbols included in each TTI configured for downlink data transmission is $X_i$, $X_i \in \{1, 2, 3, 4, 5, 6, 7\}$, where i is an index of the TTI configured for downlink data transmission in 1 ms, $0 \leq i \leq X-1$ and i is an integer.

Specifically, the embodiment includes, but not limited to, the following conditions:

$$X = 2, X_0 = \frac{N_{syb1}}{2}, X_1 = \frac{N_{syb1}}{2};$$

$$X = 4, X_0 = 4, X_1 = 3, X_2 = 4, X_3 = 3;$$

$$X = 4, X_0 = 3, X_1 = 4, X_2 = 3, X_3 = 4;$$

$$X = 6, X_0 = 2, X_1 = 3, X_2 = 2, X_3 = 2, X_4 = 3, X_5 = 2;$$

$$X = 6, X_0 = 3, X_1 = 2, X_2 = 2, X_3 = 3, X_4 = 2, X_5 = 2;$$

$$X = 6, X_0 = 2, X_1 = 2, X_2 = 3, X_3 = 2, X_4 = 2, X_5 = 3;$$

$$X = \frac{N_{syb1}}{2}, X_i = 2, 0 \leq i \leq X - 1; \text{ and}$$

$$X = N_{syb1}, X_i = 1, 0 \leq i \leq X - 1.$$

Optionally, the TTIs configured for uplink data transmission meet the following conditions: there are Y TTIs configured for uplink data transmission in 1 ms, where $2 \leq Y \leq N_{syb2}$, $N_{syb2}$ is a number of SC-FDMA symbols included in a 1 ms subframe and Y is an integer; and a number of the SC-FDMA symbols included in each TTI configured for uplink data transmission is $Y_j$, $Y_j \in \{1, 2, 3, 4, 5, 6, 7\}$, where j is an index of the TTI configured for uplink data transmission in 1 ms, $0 \leq j \leq Y-1$ and j is an integer.

Specifically, the embodiment includes, but not limited to, the following conditions:

$$Y = 2, Y_0 = \frac{N_{syb2}}{2}, Y_1 = \frac{N_{syb2}}{2};$$

$$Y = 4, Y_0 = 4, Y_1 = 3, Y_2 = 4, Y_3 = 3;$$

$$Y = 6, Y_0 = 2, Y_1 = 3, Y_2 = 2, Y_3 = 2, Y_4 = 3, Y_5 = 2;$$

$$Y = 6, Y_0 = 3, Y_1 = 2, Y_2 = 2, Y_3 = 3, Y_4 = 2, Y_5 = 2;$$

$$Y = \frac{N_{syb2}}{2}, Y_i = 2, 0 \leq i \leq Y - 1; \text{ and}$$

$$Y = N_{syb2}, Y_i = 1, 0 \leq i \leq Y - 1.$$

It should be noted that X and Y may be the same and may also be different. In addition, for convenient description, the TTIs configured for downlink data transmission are called as downlink TTIs for short and the TTIs configured for uplink data transmission are called as uplink TTIs for short below.

Optionally, when X=Y and, for i=j, $X_i=Y_j$: when the equipment is a radio base station, an index of the second target TTI is the same as an index of the first target TTI corresponding to detection of the PUSCH and the preset number is more than or equal to 4; and when the equipment is UE, the index of the second target TTI is the same as the index of the first target TTI corresponding to detection of the PDSCH and the preset number is more than or equal to 4.

Figure 3:
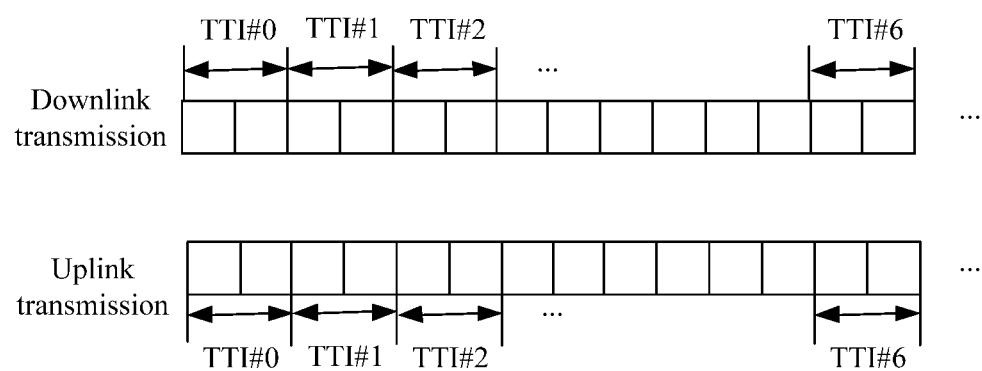
FIG. 3 is a schematic diagram of the condition that lengths of both downlink TTIs and uplink TTIs are lengths of 2 symbols according to an embodiment of the disclosure.

FIG. 3 is a schematic diagram of the condition that lengths of both downlink TTIs and uplink TTIs are lengths of 2 symbols according to an embodiment of the disclosure. As shown in FIG. 3, when X=Y=7, lengths of the TTIs configure for downlink data transmission are all 2 OFDM symbols and lengths of the TTIs configured for uplink data transmission are all 2 SC-FDMA symbols, that is, for all i=j, $X_i=Y_j$, UE detects PDSCH transmission in a downlink TTI with an index j (i.e., the first target TTI when the equipment is UE) and then transmits a corresponding HARQ-ACK response or HARQ-NACK response in an available uplink TTI with a number of $k_{n,2}=4$ (the preset number when the equipment is UE) after a TTI with an index of $n_2=j$ (i.e., the second TTI when the equipment is UE); and when a radio base station receives a PUSCH in an uplink TTI with an index i (i.e., the first target TTI when the equipment is a radio base station), the radio base station should transmit a corresponding HARQ-ACK response or HARQ-NACK response in an available downlink TTI with a number of $k_{n,1}=4$ (i.e., the preset number when the equipment is a radio base station) after a TTI with an index of $n_1=i$ (i.e., the second target TTI when the equipment is a radio base station).

Optionally, when X≠Y, a length of each TTI configured for downlink data transmission is the same and a length of each TTI configured for uplink data transmission is the same: when the equipment is a radio base station, the preset number meets the following condition:

$$k_{n,1} \geq \left\lceil \frac{M \cdot t_{BS\_de}}{N} + t_{BS\_code} \right\rceil + 1,$$

where $k_{n,1}$ is the preset number, $\lceil \ \rceil$ represents rounding up, $$\frac{1}{M} \text{ms}$$

is the length of each TTI configured for downlink data transmission, $$\frac{1}{N} \text{ms}$$

is the length of each TTI configured for uplink data transmission, $t_{BS\_de}$ is a decoding time of the radio base station receiving a PUSCH in case of a 1 ms TTI length, and $t_{BS\_code}$ is a coding time for data transmission of the radio base station in case of the 1 ms TTI length; and when X≠Y, the length of each TTI configured for downlink data transmission is the same and the length of each TTI configured for uplink data transmission is the same and when the equipment is UE, the preset number meets the following condition:

$$k_{n,2} \geq \left\lceil \frac{N \cdot t_{UE\_de}}{M} + t_{UE\_code} + \frac{2N}{3Q} \right\rceil + 1,$$

where $k_{n,2}$ is the preset number, $Q=\max\{M, N\}$, $t_{UE\_de}$ is a decoding time of the UE receiving a PDSCH in case of the 1 ms TTI length, and $t_{UE\_code}$ is a coding time for data transmission of the UE in case of the 1 ms TTI length.

Optionally, at least one of $t_{BS\_code}=t_{BS\_de}=1.5$; or $t_{UE\_code}=t_{UE\_de}=1.15$ is true.

Optionally, when N=A·M and A is an integer more than or equal to 2: when the equipment is a radio base station, the index of the second target TTI is the same as the index of the first target TTI corresponding to detection of the PDSCH; and when the equipment is UE, the index of the second target TTI meets the following condition:

$$n = A \cdot \left( \left\lfloor \frac{a}{A} \right\rfloor + 1 \right) - 1,$$

where n is the index of the second target TTI, a is the index of the first target TTI corresponding to detection of the PDSCH, and $\lfloor \ \rfloor$ represents rounding down.

Optionally, when M=B·N and B is an integer more than or equal to 2: when the equipment is a radio base station, the index of the second target TTI meets the following condition:

$$m = B \cdot \left( \left\lfloor \frac{b}{B} \right\rfloor + 1 \right) - 1,$$

where m is the index of the second target TTI, and b is the index of the first target TTI corresponding to detection of the PUSCH; and when the equipment is UE, the index of the second target TTI is the same as the index of the first target TTI corresponding to detection of the PDSCH.

Optionally, the equipment includes first equipment and second equipment, where the first equipment is a radio base station and the second equipment is UE, or the first equipment is UE and the second equipment is a radio base station; and when the first equipment corresponds to multiple sending TTIs of the second equipment in a time-domain range of the first target TTI, before the action of transmitting, by the first equipment, within the kth TTI after the second target TTI, the ACK response or NACK response corresponding to the HARQ of the physical shared channel, the method further includes that: at least one binding window is set for the multiple sending TTIs of the second equipment in the first target TTI of the first equipment, where each binding window includes at least one of the sending TTIs of the second equipment.

Optionally, each binding window is configured for independent HARQ feedback.

Figure 4:
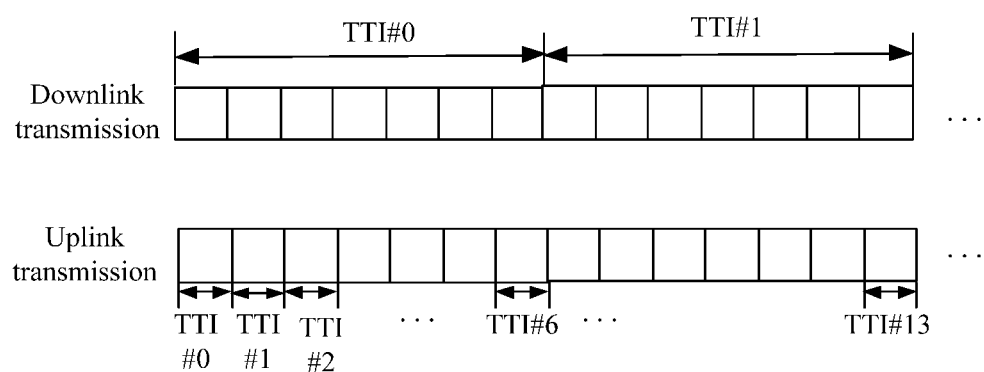
FIG. 4 is a schematic diagram of the condition that lengths of downlink TTIs are 0.5 ms and lengths of uplink TTIs are lengths of one symbol according to an embodiment of the disclosure.

FIG. 4 is a schematic diagram of the condition that lengths of downlink TTIs are 0.5 ms and lengths of uplink TTIs are lengths of one symbol according to an embodiment of the disclosure. As shown in FIG. 4, when X=2, Y=14, the lengths of the TTIs configured for downlink data transmission are all 7 OFDM symbols and the lengths of the TTIs configured for uplink data transmission are all one SC-FDMA symbol, that is, for all i=j, $X_i=7$, $Y_j=1$, M=2, N=14, a HARQ timing relationship may be set to meet the following conditions: $n_1=i$, $k_{n,1} \geq 3$, $$n_2 = 7 \cdot \left( \left\lfloor \frac{j}{7} \right\rfloor + 1 \right) - 1$$

and $k_{n,2} \geq 11$. For example, the UE detects PDSCH transmission in a downlink TTI with an index of j=0~6 (i.e., the first target TTI when the equipment is UE) and then transmits a corresponding HARQ-ACK response or HARQ-NACK response in an available uplink TTI with a number of $k_{n,2}=11$ (i.e., the preset number when the equipment is UE) after a TTI with an index of $n_2=6$ (i.e., the second TTI when the equipment is UE); and when the radio base station receives the PUSCH in an uplink TTI with an index of i=0 (i.e., the first target TTI when the equipment is a radio base station), the radio base station should transmit a corresponding HARQ-ACK response or HARQ-NACK response in an available downlink TTI with a number of $k_{n,1}=3$ (i.e., the preset number when the equipment is a radio base station) after a TTI with an index of $n_1=0$ (i.e., the second target TTI when the equipment is a radio base station). It should be noted that there are multiple corresponding uplink TTIs (at most 7) of the same user in a downlink TTI time window corresponding to i=0 and binding timing feedback may be performed on the multiple uplink TTIs.

Figure 5:
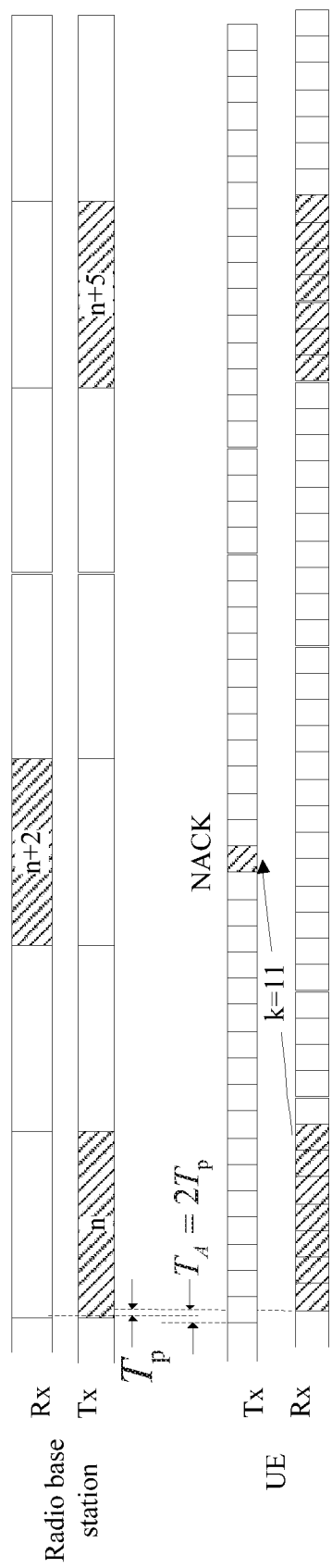
FIG. 5 is a schematic diagram of a downlink HARQ timing relationship when lengths of downlink TTIs are 0.5 ms and lengths of uplink TTIs are lengths of one symbol according to an embodiment of the disclosure.

FIG. 5 is a schematic diagram of a downlink HARQ timing relationship when lengths of downlink TTIs are 0.5 ms and lengths of uplink TTIs are lengths of one symbol according to an embodiment of the disclosure. As shown in FIG. 5, there are 7 corresponding uplink TTIs in a downlink TTI time window with an index of n, $T_P$ is a propagation delay and $T_A=2T_P$ is a time advance of a sent frame of the UE relative to a received frame, where uplink transmission symbols adopt a normal cyclic prefix (that is, each 0.5 ms slot includes 7 SC-FDMA symbols). For all i=j, $X_i=7$, $Y_j=1$, M=2, N=14, and according to the embodiment of the disclosure, a downlink HARQ timing relationship may be set to meet the following conditions:

$$n_2 = 7 \cdot \left( \left\lfloor \frac{j}{7} \right\rfloor + 1 \right) - 1$$

and $k_{n,2} \geq 11$. For example, the UE detects PDSCH transmission in a corresponding uplink TTI with an index j=0~6 (i.e., the first target TTI when the equipment is UE) in a downlink TTI time window with an index of n and then transmits a corresponding HARQ-ACK response or HARQ-NACK response in an uplink TTI with a number of $k_{n,2}=11$ (i.e., the preset number when the equipment is UE) after a TTI with an index of $n_2=6$ (i.e., the second TTI when the equipment is UE); and the radio base station receives feedback information in a TTI with an index of n+2, and if the NACK response is fed back, exemplarily in FIG. 5, the base station performs data retransmission in a downlink TTI with an index of n+5.

Figure 6:
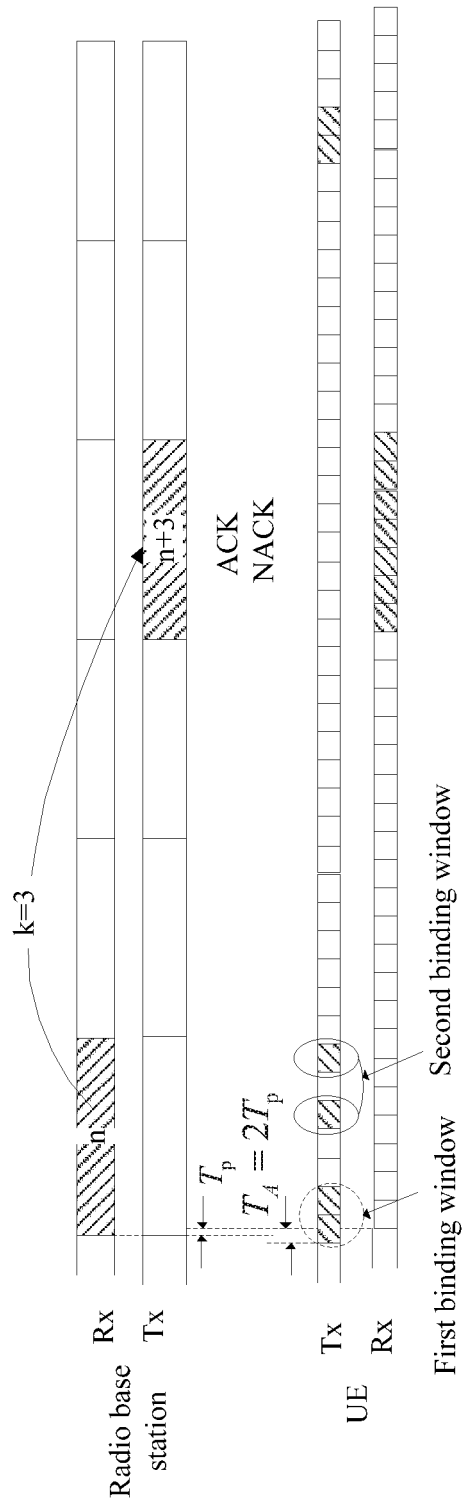
FIG. 6 is a schematic diagram of an uplink HARQ timing relationship when lengths of downlink TTIs are 0.5 ms and lengths of uplink TTIs are lengths of one symbol according to an embodiment of the disclosure.

FIG. 6 is a schematic diagram of an uplink HARQ timing relationship when lengths of downlink TTIs are 0.5 ms and lengths of uplink TTIs are lengths of one symbol according to an embodiment of the disclosure. As shown in FIG. 6, there is made such a hypothesis that UE performs uplink data transmission in four uplink TTIs corresponding to a downlink TTI with an index of n. For uplink HARQ timing, two binding windows are set for all the uplink TTIs of a user according to the embodiment. The first binding window is set for the first two uplink TTIs configured for data transmission of the user, and the second binding window is set for the last two uplink TTIs. Each binding window performs HARQ timing in a unified manner, an ACK is fed back only in case of correct reception of all the uplink TTIs in the binding windows, otherwise a NACK is fed back. In the embodiment, when the radio base station receives the PUSCH in a TTI with an index of i=0 (i.e., the first target TTI when the equipment is a radio base station), the radio base station should transmit a corresponding HARQ-ACK response or HARQ-NACK response in an available downlink TTI with a number of $k_{n,1}=3$ (i.e., the preset number when the equipment is a radio base station) after a TTI with an index of $n_1=n$ (i.e., the second target TTI when the equipment is a radio base station), that is, HARQ ACK is performed in the downlink TTI with an index of n+3. In the embodiment, there is made such a hypothesis that the ACK response is fed back in the first binding window and the NACK response is fed back in the second binding window, so that only data in the second binding window is required to be retransmitted.

It should be noted that binding feedback may reduce an overhead in feedback of ACK or NACK information, and binding windows may be flexibly set according to a channel condition or with the same resource.

In addition, It should be noted that a sending manner for retransmitted data is not limited in the embodiment of the disclosure and retransmission may adopt synchronous HARQ retransmission or asynchronous HARQ retransmission.

Those skilled in the art should know that setting of the binding windows in the embodiment is only one of possible embodiments of the disclosure. When the UE uses different numbers of uplink TTIs at different locations for data transmission in a downlink TTI time window or another condition that a downlink TTI time window corresponds to multiple uplink TTIs, a specific number of binding windows and a number of TTIs in each binding window may be set to be different in a static or dynamic manner.

Those skilled in the art should know that, correspondingly, when a length of a TTI for uplink transmission is larger than a length of a TTI for downlink transmission, that is, a receiving TTI of UE corresponds to multiple downlink TTIs of a radio base station, a binding window method provided by the embodiment of the disclosure may be clearly adopted for binding timing.

Figure 7:
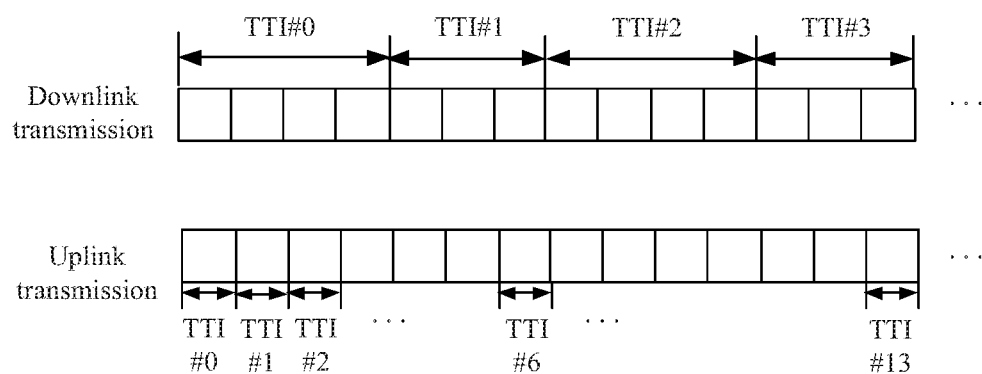
FIG. 7 is a schematic diagram of the condition that lengths of downlink TTIs adopt a 4-3 structure and lengths of uplink TTIs are lengths of one symbol according to an embodiment of the disclosure.

FIG. 7 is a schematic diagram of the condition that lengths of downlink TTIs adopt a 4-3 structure and lengths of uplink TTIs are lengths of one symbol according to an embodiment of the disclosure, where that the lengths of the downlink TTIs adopt the 4-3 structure refers to that a length of a TTI with an even index for downlink transmission is a length of 4 symbols and a length of a TTI with an odd index is a length of 3 symbols. As shown in FIG. 7, X=4, Y=14, $X_0$=4, $X_1$=3, $X_2$=4, $X_3$=3, and for 0≤j≤13, $Y_j$=1.

It should be noted that, for the embodiment shown in FIG. 7, there may be multiple corresponding uplink TTIs (at most 4 or 3) of the same UE in a downlink TTI time window and one or more binding windows may be set for multiple sending TTIs belonging to the same UE; there is one or more sending TTIs in each binding window; a number of the sending TTIs included in each binding window may be the same or different; and each binding window performs independent HARQ feedback.

In the embodiment, when X=4, Y=14, $X_0$=4, $X_1$=3, $X_2$=4, $X_3$=3 and, for 0≤j≤13, $Y_j$=1, when PDSCH transmission is detected by UE in the first target TTIs, the ACK response or NACK response corresponding to the PDSCH is transmitted, within an eighth TTI or an TTI later than the eighth TTI after the second target TTI; the first target TTIs with indexes of 0 to 3 corresponding to the second target TTI with index of 3, and the first target TTIs with indexes of 7 to 10 corresponding to the second target TTI with index of 7. When PDSCH transmission is detected by the UE in the first target TTIs, the ACK response or NACK response corresponding to the PDSCH is transmitted, within a seventh TTI or an TTI later than the seventh TTI after the second target TTI; the first target TTIs with indexes of 4 to 6 corresponding to the second target TTI with index of 6, and the first target TTIs with indexes of 11 to 13 corresponding to the second target TTI with index of 13. When PUSCH transmission is detected by a radio base station in the first target TTI, the ACK response or NACK response corresponding to the PUSCH is transmitted, within a fourth TTI or an TTI later than the fourth TTI after the second target TTI; the first target TTI with index of 0 corresponding to the second target TTI with index of 0, and the first target TTI with index of 2 corresponding to the second target TTI with index of 2. When PUSCH transmission is detected by the radio base station in the first target TTI, the ACK response or NACK response corresponding to the PUSCH is transmitted, within a third TTI or an TTI later than the third TTI after the second target TTI; the first target TTI with index of 1 corresponding to the second target TTI with index of 1, and the first target TTI with index of 3 corresponding to the second target TTI with index of 3.

Figure 8:
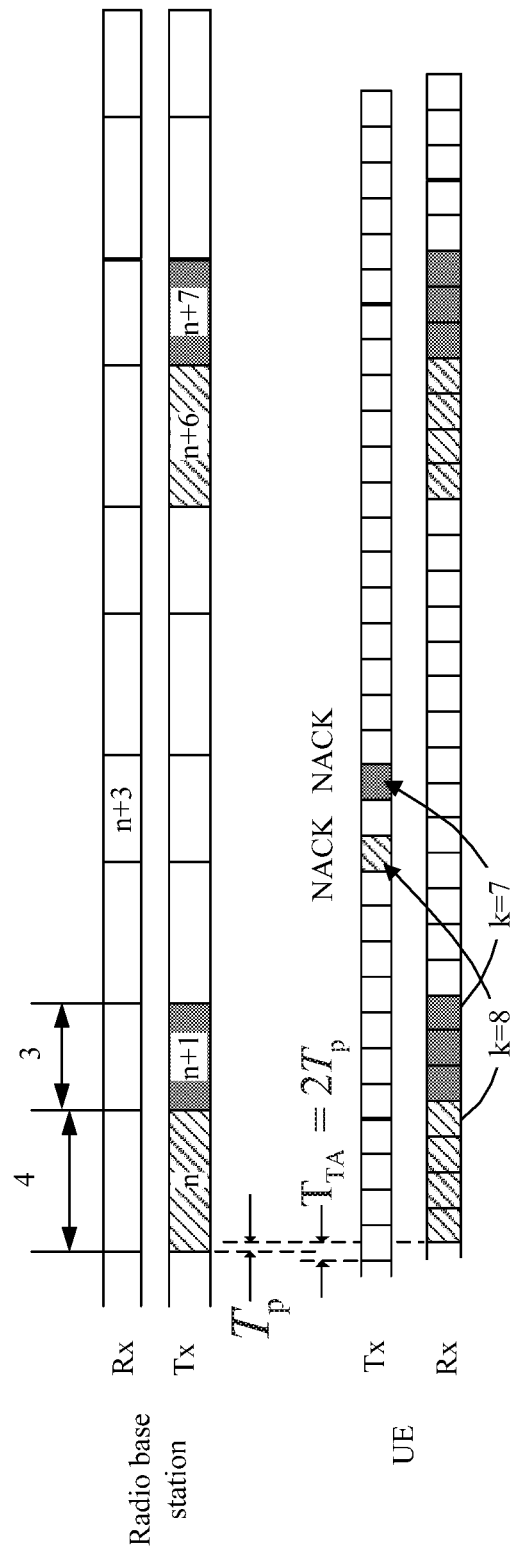
FIG. 8 is a schematic diagram of a downlink HARQ timing relationship when lengths of downlink TTIs adopt a 4-3 structure and lengths of uplink TTIs are lengths of one symbol according to an embodiment of the disclosure.
Figure 9:
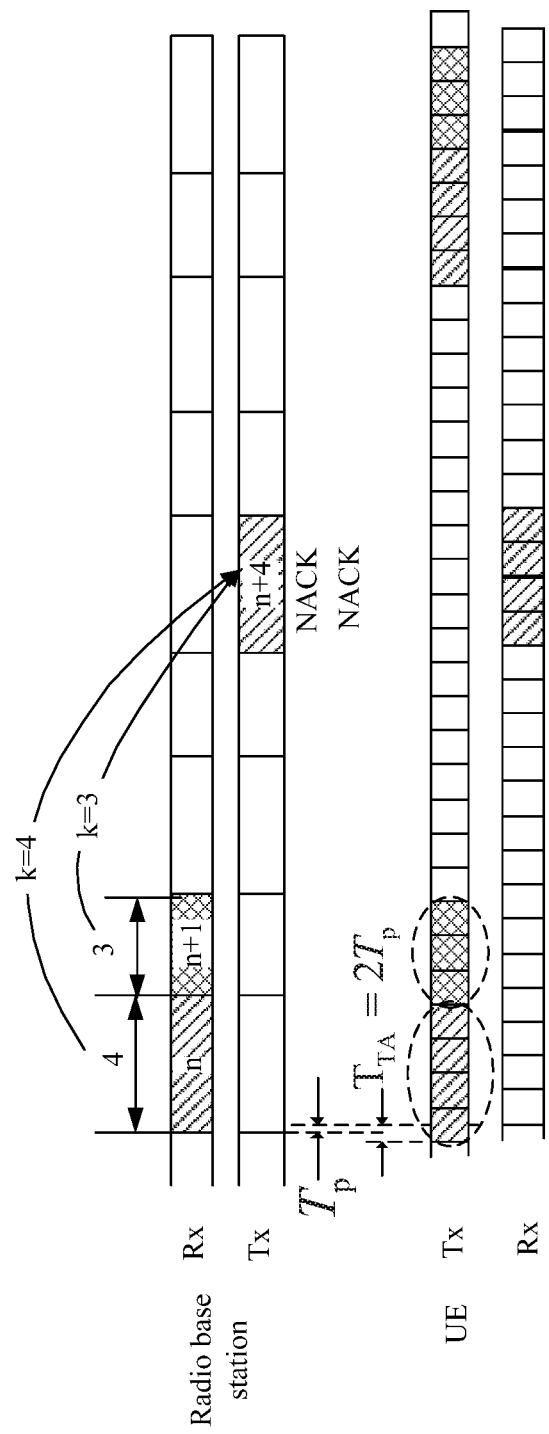
FIG. 9 is a schematic diagram of an uplink HARQ timing relationship when lengths of downlink TTIs adopt a 4-3 structure and lengths of uplink TTIs are lengths of one symbol according to an embodiment of the disclosure.

Specifically, FIG. 8 is a schematic diagram of a downlink HARQ timing relationship when lengths of downlink TTIs adopt a 4-3 structure and lengths of uplink TTIs are lengths of one symbol according to an embodiment of the disclosure. FIG. 9 is a schematic diagram of an uplink HARQ timing relationship when lengths of downlink TTIs adopt a 4-3 structure and lengths of uplink TTIs are lengths of one symbol according to an embodiment of the disclosure.

As shown in FIG. 8, the 4-3 structure refers to that X=4 and lengths of downlink TTIs with indexes of i=0, 1, 2, 3 in each 1 ms subframe are lengths of 4, 3, 4 and 3 OFDM symbols respectively. In FIG. 8, $T_P$ is a propagation delay and $T_A$=$2T_P$ is a time advance of a sent frame of UE relative to a received frame. As shown in FIG. 8, when the UE detects PDSCH transmission in a receiving TTI (i.e., the first target TTI when the equipment is UE) with an index of j=0~3, a corresponding HARQ-ACK response or HARQ-NACK response is transmitted in an available uplink TTI with a number of $k_{n,2}$8 (i.e., the preset number when the equipment is UE) after a TTI with an index of $n_2$=3 (i.e., the second target TTI when the equipment is UE); and when the UE detects PDSCH transmission in a receiving TTI with an index of j=4~6 (i.e., the first target TTI when the equipment is UE), a corresponding HARQ-ACK response or HARQ-NACK response is transmitted in an available uplink TTI with a number of $k_{n,2}$=7 (i.e., the preset number when the equipment is UE) after a TTI with an index of $n_2$=6 (i.e., the second target TTI when the equipment is UE). As shown in FIG. 8, a radio base station receives feedback information in a TTI with an index of (n+3), and if a NACK is fed back, the base station may retransmit downlink data in indexes n and (n+1) in downlink TTIs with an index of (n+6) and an index of (n+7) respectively.

As shown in FIG. 9, there is made such a hypothesis that UE performs uplink data transmission in seven first continuous uplink TTIs. According to the embodiment, a binding window may be set for all of four uplink TTIs configured for data transmission of a user in a downlink TTI time window with an index of n and another binding window may be set for three uplink TTIs configured for data transmission of the user in a downlink TTI time window with an index of (n+1). Each binding window performs HARQ timing in a unified manner, an ACK response is fed back only in case of correct reception of all the uplink TTIs in the binding windows, otherwise a NACK response is fed back. Specifically, an uplink HARQ timing relationship according to the embodiment is as follows: when the radio base station receives the PUSCH in a TTI with an index of n (i.e., the first target TTI when the equipment is a radio base station), the radio base station should transmit a corresponding HARQ-ACK response or HARQ-NACK response in an available downlink TTI with a number of $k_{n,1}$=4 (i.e., the preset number when the equipment is a radio base station) after a TTI with an index of $n_1$=n (i.e., the second target TTI when the equipment is a radio base station); and when the radio base station receives the PUSCH in a TTI with an index of n+1 (i.e., the first target TTI when the equipment is a radio base station), the radio base station should transmit a corresponding HARQ-ACK response or HARQ-NACK response in an available downlink TTI with a number of $k_{n,1}$=3 (i.e., the preset number when the equipment is a radio base station) after a TTI with an index of $n_1$=n+1 (i.e., the second target TTI when the equipment is a radio base station).

It should be noted that, in the embodiment, for an even index, $k_{n,1}$=3 means that there is required an interval of two TTIs including four symbols but a length of one of two subsequent TTIs is three symbols, so that an additional interval of one TTI is required to meet a timing relationship, that is, for a TTI with an even index, $k_{n,1}$=4.

In addition, the sending manner for the retransmitted data is not limited in the embodiment of the disclosure and retransmission may adopt synchronous HARQ retransmission or asynchronous HARQ retransmission.

Figure 10:
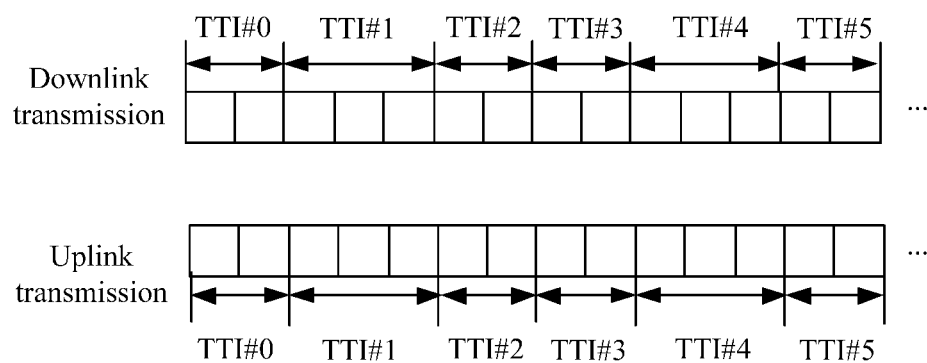
FIG. 10 is a schematic diagram of the condition that lengths of downlink TTIs and uplink TTIs both adopt a 2-3-2 structure according to an embodiment of the disclosure.

FIG. 10 is a schematic diagram of the condition that lengths of downlink TTIs and uplink TTIs both adopt a 2-3-2 structure according to an embodiment of the disclosure. The embodiment may be used as a preferred implementation mode when X=Y and, for i=j, $X_i$=$Y_j$. As shown in FIG. 10, X=6, Y=6, $X_0$=2, $X_1$3, $X_2$=2, $X_3$=2, $X_4$=3, $X_5$=2, $Y_0$=2, $Y_1$=3, $Y_2$=2, $Y_3$=2, $Y_4$=3, $Y_5$=2.

when X=6, Y=6, $X_0$=2, $X_1$=3, $X_2$=2, $X_3$=2, $X_4$=3, $X_5$=2, $Y_0$=2, $Y_1$=3, $Y_2$=2, $Y_3$=2, $Y_4$=3, $Y_5$=2 (it is ensured that there are CRSs or DMRSs in each TTI): when the UE detects PDSCH transmission in the first target TTI, an ACK response or NACK response corresponding to PDSCH transmission is transmitted in a fourth or TTI after the fourth after the first target TTI; and when the radio base station detects PUSCH transmission in the first target TTI, an ACK response or NACK response corresponding to PUSCH transmission is transmitted in the fourth or TTI after the fourth after the first target TTI is transmitted.

Optionally, at least one of two adjacent TTIs configured for downlink data transmission at least includes one of CRSs or DMRSs.

Optionally, before the action of transmitting, by the equipment, the ACK response or NACK response corresponding to the HARQ of the physical shared channel in the TTI with the preset number after the second target TTI, the method further includes that: at least one of two adjacent TTIs configured for downlink data transmission is made to at least include one of CRSs or DMRSs by virtue of any one of the following actions: executing division on a 1 ms TTI according to locations of CRSs or DMRSs in a 1 ms subframe to make at least one of two adjacent TTIs configured for downlink data transmission at least include one of the CRSs or the DMRSs; increasing a number of the CRSs or DMRSs in the 1 ms subframe and executing division on the 1 ms TTI after the number of the CRSs or the DMRSs is increased to make the at least one of the two adjacent TTIs configured for downlink data transmission at least include one of the CRSs or DMRSs; and regulating the locations of the CRSs or DMRSs in the 1 ms subframe and executing division on the 1 ms TTI after the locations of the CRSs or the DMRSs are regulated to make the at least one of the two adjacent TTIs configured for downlink data transmission at least include one of the CRSs or the DMRSs.

Optionally, at least one of two adjacent TTIs configured for uplink data transmission includes DMRSs.

Optionally, before the action of transmitting, by the equipment, within the kth TTI after the second target TTI, the ACK response or NACK response corresponding to the HARQ of the physical shared channel, the method further includes that: at least one of two adjacent TTIs configured for uplink data transmission is made to at least include DMRSs by virtue of any one of the following actions: executing division on a 1 ms TTI according to locations of DMRSs in a 1 ms subframe to make at least one of two adjacent TTIs configured for uplink data transmission at least include the DMRSs; increasing a number of the DMRSs in the 1 ms subframe and executing division on the 1 ms TTI after the number of the DMRSs is increased to make the at least one of the two adjacent TTIs configured for uplink data transmission at least include the DMRSs; and regulating the locations of the DMRSs in the 1 ms subframe and executing division on the 1 ms TTI after the locations of the DMRSs are regulated to make the at least one of the two adjacent TTIs configured for downlink data transmission at least include the DMRSs.

It should be noted that those skilled in the art should know that a time-frequency structure after a TTI length is reduced is not limited in the embodiment of the disclosure, that is, reduction of the TTI length may be implemented by reducing a number of time-domain symbols in the TTI, or reduction of the TTI length may be implemented by modifying a subcarrier spacing, or reduction of the TTI length may be implemented by combining the abovementioned factors.

From the above descriptions about implementation modes, those skilled in the art may clearly learn about that the method according to the embodiment may be implemented in a manner of combining software and a necessary universal hardware platform, and of course, may also be implemented through hardware, but the former is a preferred implementation mode under many conditions. Based on such an understanding, the technical solution of the disclosure substantially or parts making contributions to a conventional art may be embodied in form of software product, and the computer software product is stored in a storage medium (for example, a Read-Only Memory (ROM)/Random Access Memory (RAM), a magnetic disk and an optical disk), including a plurality of instructions configured to enable a piece of UE (which may be a mobile phone, a computer, a server, network equipment or the like) to execute the method of each embodiment of the disclosure.

An embodiment further provides a HARQ timing device, which is configured to implement the abovementioned embodiments and preferred implementation modes, and what has been described will not be elaborated. For example, term "module", used below, may be a combination of software and hardware capable of realizing a preset function. Although the device described in the following embodiment is preferably implemented with software, implementation with hardware or a combination of the software and the hardware is also possible and conceivable.

Figure 11:
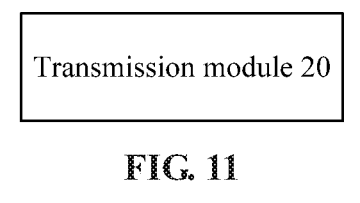

FIG. 11 is a structure block diagram of a HARQ timing device according to an embodiment of the disclosure. As shown in FIG. 11, the device includes: a transmission module 20.

The transmission module 20 is configured to, when physical shared channel transmission is detected in a first target TTI, transmit, within a kth TTI after a second target TTI, an ACK response or NACK response corresponding to a HARQ of a physical shared channel, where k is a preset number and where at least one of a number $L_1$ of symbols included in TTIs configured for downlink data transmission or a number $L_2$ of symbols included in TTIs configured for uplink data transmission meets the following conditions: $L_1 \in \{1, 2, 3, 4, 5, 6, 7\}$ and I=1 or 2.

According to the embodiment, when lengths of the TTIs configured for downlink data transmission or the TTIs configured for uplink data transmission are further reduced and when physical shared channel transmission is detected in the first target TTI, the transmission module transmits, within the kth TTI after the second target TTI, the ACK response or NACK response corresponding to the HARQ of the physical shared channel, so that the problem in the related technology that a HARQ timing relationship may not meet further reduction of a TTI length is solved, and the effect that the HARQ timing relationship may flexibly support a low-delay service is further achieved.

It should be noted that each module may be implemented through software or hardware, and the latter condition may be implemented in, but not limited to, the following manners: the modules are all located in the same processor, or, the modules are located in multiple processors respectively.

Obviously, those skilled in the art should know that each module or each step of the disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the disclosure is not limited to any specific hardware and software combination.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

An embodiment of the disclosure further provides a storage medium. Optionally, in the embodiment, the storage medium may be configured to store a program code configured to execute the following step:

in S1, upon detection of physical shared channel transmission in a first target TTI, the equipment transmits, within a kth TTI after a second target TTI, an ACK response or NACK response corresponding to a HARQ of a physical shared channel, where k is a preset number after a second target TTI and where at least one of a number $L_1$ of symbols included in TTIs configured for downlink data transmission or a number $L_2$ of symbols included in TTIs configured for uplink data transmission meets the following conditions: $L_1 \in \{1, 2, 3, 4, 5, 6, 7\}$ and I=1 or 2.

Optionally, in the embodiment, the storage medium may include, but not limited to: various media capable of storing program codes such as a U disk, a ROM, a RAM, a mobile hard disk, a magnetic disk or an optical disk.

Optionally, specific examples in the embodiment may refer to examples described in the abovementioned embodiments and optional implementation modes and will not be elaborated in the embodiment.

INDUSTRIAL APPLICABILITY

In the embodiment, when the equipment detects physical shared channel transmission in the first target TTI, the equipment transmits, within the kth TTI after the second target TTI, the ACK response or NACK response corresponding to the HARQ of the physical shared channel, where at least one of the number $L_1$ of the symbols included in the TTIs configured for downlink data transmission or the number $L_2$ of the symbols included in the TTIs configured for uplink data transmission meets the following conditions: $L_1 \in \{1, 2, 3, 4, 5, 6, 7\}$ and I=1 or 2. Therefore, the problem in the related technology that a HARQ timing relationship may not meet further reduction of a TTI length is solved, and the effect that the HARQ timing relationship may flexibly support a low-delay service is further achieved.

The invention claimed is:

1. A method for determining a transmission duration pattern in one subframe, comprising:
   transmitting data in the transmission duration pattern of the transmission duration pattern,
   wherein there are X Transmission Time Intervals (TTIs) configured for transmission in one subframe, wherein $2 \leq X \leq N_{syb1}$, $N_{syb1}$ is a number of symbols comprised in a 1 ms subframe and X is an integer; and a number of symbols comprised in each TTI configured for transmission is $X_i$, $X_i \in \{1,2,3,4,5,6,7\}$, where is i an index of the TTI configured for transmission in 1 ms, $0 \leq i \leq X-1$ and i is an integer;
   wherein X=6;
   wherein there are 3 TTIs in each of the two slots in one subframe; and
   wherein in response to a TTI configured for downlink data transmission, a number of symbols comprised in the TTI configured for downlink data transmission in a second slot is $X_3=2$, $X_4=2$, $X_5=3$.

2. The method according to claim 1, wherein, in response to the TTI configured for downlink data transmission, a number of symbols comprised in the TTI configured for downlink data transmission in a first slot is $X_0=2$, $X_1=3$, $X_2=2$.

3. The method according to claim 1, wherein, in response to the TTI configured for downlink data transmission, a number of symbols comprised in the TTI configured for downlink data transmission in a first slot is $X_0=3$, $X_1=2$, $X_2=2$.

4. The method according to claim 1, wherein, in response to a TTI configured for uplink data transmission, a number of symbols comprised in the TTI configured for uplink data transmission in a first slot is $X_3=2$, $X_4=2$, $X_5=3$.

5. The method according to claim 1, wherein, in response to a TTI configured for uplink data transmission, a number of symbols comprised in the TTI configured for uplink data transmission in the second slot is $X_3=2$, $X_4=2$, $X_5=3$.

6. The method according to claim 1, wherein, in response to a TTI configured for uplink data transmission, a number of symbols comprised in the TTI configured for uplink data transmission in the second slot is $X_3=3$, $X_4=2$, $X_5=2$.

7. The method according to claim 1, further comprising:
   upon detection of physical shared channel transmission in a first target TTI, transmitting, within a kth TTI after a second target TTI, by a first equipment, an Acknowledged (ACK) response or Non-Acknowledged (NACK) response corresponding to a HARQ of a physical shared channel, wherein k is a preset number, wherein at least one of a number $L_1$ of symbols comprised in TTIs configured for downlink data transmission or a number $L_2$ of symbols comprised in TTIs configured for uplink data transmission meets the following conditions: $L_1 \in \{1, 2,3,4,5,6, 7\}$ and l=1 or 2.

8. The method according to claim 7, wherein
   when the first equipment is a radio base station, the physical shared channel is a Physical Uplink Share Channel (PUSCH), and the kth TTI after the second target TTI is the TTI configured for downlink data transmission; and when the first equipment is User Equipment (UE), the physical shared channel is a Physical Downlink Share Channel (PDSCH), and the kth TTI after the second target TTI is an TTI configured for uplink data transmission.

9. The method according to claim 7, wherein, the TTIs configured for downlink data transmission meet the following conditions: there are X' TTIs configured for downlink data transmission in 1 ms, where $2 \leq X' \leq N_{syb1}$; and a number of OFDM symbols included in each TTI configured for downlink data transmission is $X_{i'}$, $X_{i'} \in \{1, 2, 3, 4, 5, 6, 7\}$, where i' is an index of the TTI configured for downlink data transmission in 1 ms, $0 \leq i' \leq X'-1$ and i' is an integer;
   the TTIs configured for uplink data transmission meet the following conditions: there are Y TTIs configured for uplink data transmission in 1 ms, where $2 \leq Y \leq N_{syb2}$, $N_{syb2}$ is a number of SC-FDMA symbols included in a 1 ms subframe and Y is an integer; and a number of the SC-FDMA symbols included in each TTI configured for uplink data transmission is $Y_j$, $Y_j \in \{1, 2, 3, 4, 5, 6, 7\}$, where j is an index of the TTI configured for uplink data transmission in 1 ms, $0 \leq j \leq Y-1$ and j is an integer;

wherein when X'=Y and, for i'=j, $X_{i'}=Y_j$,
when the first equipment is a radio base station, an index of the second target TTI is the same as an index of the first target TTI corresponding to detection of a Physical Uplink Share Channel (PUSCH) and the preset number is more than or equal to 4; and
when the first equipment is User Equipment (UE), the index of the second target TTI is the same as the index of the first target TTI corresponding to detection of a Physical Downlink Share Channel (PDSCH) and the preset number is more than or equal to 4.

10. The method according to claim 7, wherein there is further a second equipment, wherein the first equipment is a radio base station and the second equipment is UE, or the first equipment is UE and the second equipment is a radio base station; wherein when the first equipment corresponds to a plurality of sending TTIs of the second equipment in a time-domain range of the first target TTI, before the first equipment transmits, within the kth TTI after the second target TTI, the ACK response or NACK response corresponding to the HARQ of the physical shared channel, the method further comprises:
setting at least one binding window for the plurality of sending TTIs of the second equipment in the first target TTI of the first equipment, wherein each binding window comprises at least one of the sending TTIs of the second equipment.

11. The method according to claim 10, wherein each binding window is configured for independent HARQ feedback.

12. The method according to claim 7, before transmitting, within the kth TTI after the second target TTI, by the first equipment, the ACK response or NACK response corresponding to the HARQ of the physical shared channel, further comprising:
making at least one of two adjacent TTIs configured for downlink data transmission to at least comprise one of Cell-specific Reference Signals (CRSs) or Demodulation Reference Signals (DMRSs) by virtue of any one of the following actions:
executing division on a 1 ms TTI according to locations of CRSs or DMRSs in a 1 ms subframe to make at least one of two adjacent TTIs configured for downlink data transmission at least comprise one of the CRSs or the DMRSs;
increasing a number of the CRSs or DMRSs in the 1 ms subframe and executing division on the 1 ms TTI after the number of the CRSs or the DMRSs is increased to make the at least one of the two adjacent TTIs configured for downlink data transmission at least comprise one of the CRSs or DMRSs; and
regulating the locations of the CRSs or DMRSs in the 1 ms subframe and executing division on the 1 ms TTI after the locations of the CRSs or the DMRSs are regulated to make the at least one of the two adjacent TTIs configured for downlink data transmission at least comprise one of the CRSs or the DMRSs.

13. The method according to claim 1, wherein at least one of two adjacent TTIs configured for downlink data transmission at least comprise Demodulation Reference Signals (DMRSs).

14. The method according to claim 1, wherein at least one of two adjacent TTIs configured for uplink data transmission comprises DMRSs.

* * * * *